(12) United States Patent
Tinnin et al.

(10) Patent No.: US 7,475,907 B2
(45) Date of Patent: Jan. 13, 2009

(54) LOW-MOUNTED COLUMN RAKE SPRING

(75) Inventors: Lee Tinnin, Clio, MI (US); Kevin L. Derry, Wheeler, MI (US)

(73) Assignee: Delphi Technologies, Inc., Troy, MI (US)

(*) Notice: Subject to any disclaimer, the term of this patent is extended or adjusted under 35 U.S.C. 154(b) by 345 days.

(21) Appl. No.: 10/914,834

(22) Filed: Aug. 10, 2004

(65) Prior Publication Data

US 2006/0033319 A1 Feb. 16, 2006

(51) Int. Cl.
*B62D 1/18* (2006.01)
(52) U.S. Cl. ..................................... 280/775
(58) Field of Classification Search ............... 280/775, 280/779; 74/493, 492; 464/140, 162
See application file for complete search history.

(56) References Cited

U.S. PATENT DOCUMENTS

| | | | | |
|---|---|---|---|---|
| 6,134,983 A * | 10/2000 | Armstrong et al. | ............ | 74/493 |
| 6,364,357 B1 * | 4/2002 | Jurik et al. | ............ | 280/775 |
| 6,419,269 B1 * | 7/2002 | Manwaring et al. | ......... | 280/775 |
| 6,591,709 B1 * | 7/2003 | Kim et al. | ............ | 74/493 |
| 6,923,473 B2 * | 8/2005 | Ryne et al. | ............ | 280/775 |

* cited by examiner

*Primary Examiner*—John Q. Nguyen
*Assistant Examiner*—Robert A. Coker
(74) *Attorney, Agent, or Firm*—Thomas N. Twomey

(57) ABSTRACT

The present invention provides an apparatus and method for pivoting and locking a steering column. The apparatus of the invention includes a steering column extending axially between first and second ends. The steering column is pivotally mountable to a vehicle at the second end. The apparatus also includes a locking mechanism spaced from the second end. The locking mechanism is operative to releasibly secure the steering column in a selected position of adjustment. The apparatus also includes a spring urging the steering column in a first pivoting direction. The spring is disposed in axially spaced relation adjacent to said locking mechanism. The method of the invention includes the step of pivotally mounting a steering column that extends axially between first and second ends to a vehicle. The method also includes the step of releasibly securing the steering column in a selected position of adjustment with a locking mechanism that is spaced from the second end. The method also includes the step of urging the steering column in a first pivoting direction with a spring that is disposed in axially spaced relation adjacent to the locking mechanism.

17 Claims, 3 Drawing Sheets

LOW-MOUNTED COLUMN RAKE SPRING

FIELD OF THE INVENTION

The invention relates to a steering column of a vehicle and more particularly to an arrangement for urging the steering column in pivoting movement and for locking the steering column relative to the vehicle.

BACKGROUND OF THE INVENTION

Steering columns support the steering wheel in a vehicle and can be pivoted relative the vehicle to enhance the comfort of the driver. For example, the steering column is pivoted by the driver to optimize the position of the steering wheel. A locking device is associated with the steering column to lock the steering column in place after the driver has selected the optimum position of the steering wheel. A biasing device is often associated with the steering column to reduce the effort required to adjust the steering column.

SUMMARY OF THE INVENTION AND ADVANTAGES

The present invention provides an apparatus and method for pivoting and locking a steering column. The apparatus of the invention includes a steering column extending axially between first and second ends. The steering column is pivotally mountable to a vehicle at the second end. The apparatus also includes a locking mechanism spaced from the second end. The locking mechanism is operative to releasibly secure the steering column in a selected position of adjustment. The apparatus also includes a coiled compression spring urging the steering column in a first pivoting direction. The spring is disposed in axially spaced relation adjacent to said locking mechanism.

The method of the invention includes the step of pivotally mounting to a vehicle a steering column that extends axially between first and second ends. The method also includes the step of releasibly securing the steering column in a selected position of adjustment with a locking mechanism that is spaced from the second end. The method also includes the step of urging the steering column in a first pivoting direction with a coiled compression spring that is disposed in axially spaced relation adjacent to the locking mechanism.

The exemplary embodiment of the invention provides several advantages over previously known steering columns. At least one advantage is that the spring will continue to support the steering column if the locking mechanism becomes disassociated with the vehicle. Another advantage is that the spring will not produce frictional drag on the steering column during telescopic adjustment of the steering column.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
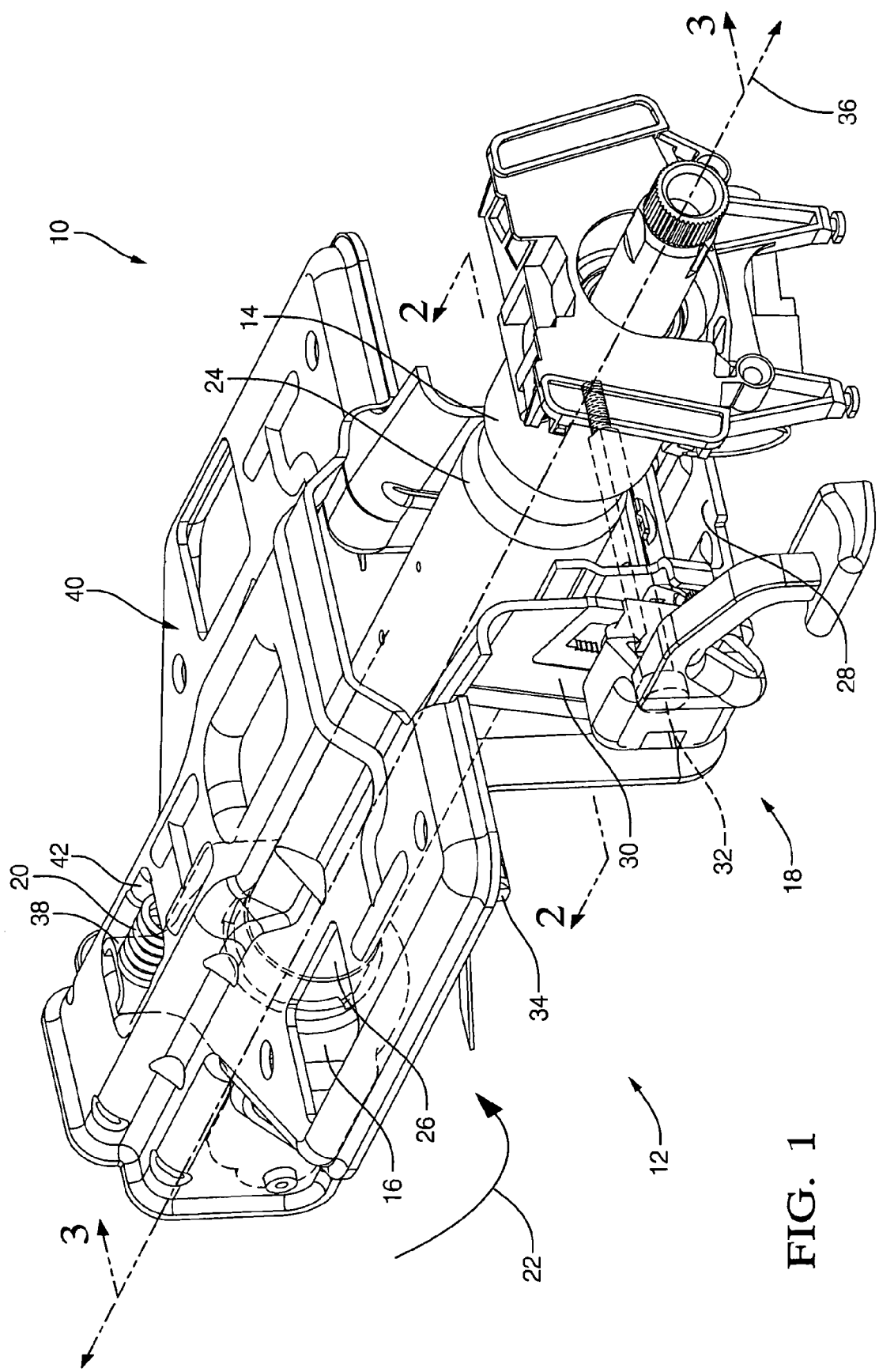
FIG. 1 is a perspective view of the exemplary embodiment of the invention.
Figure 2:
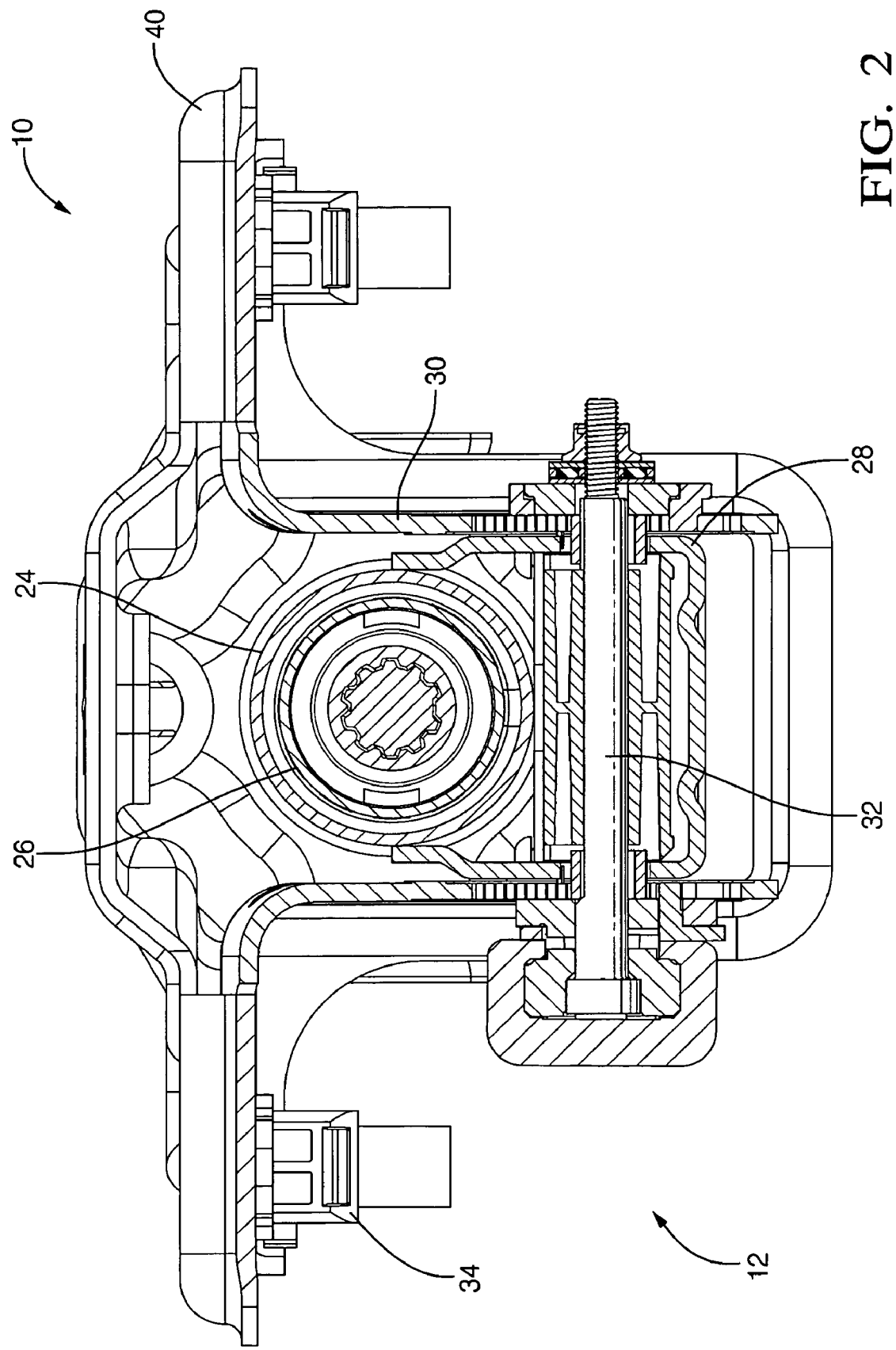
FIG. 2 is a cross-sectional view taken along lines 2-2 in FIG. 1.
Figure 3:
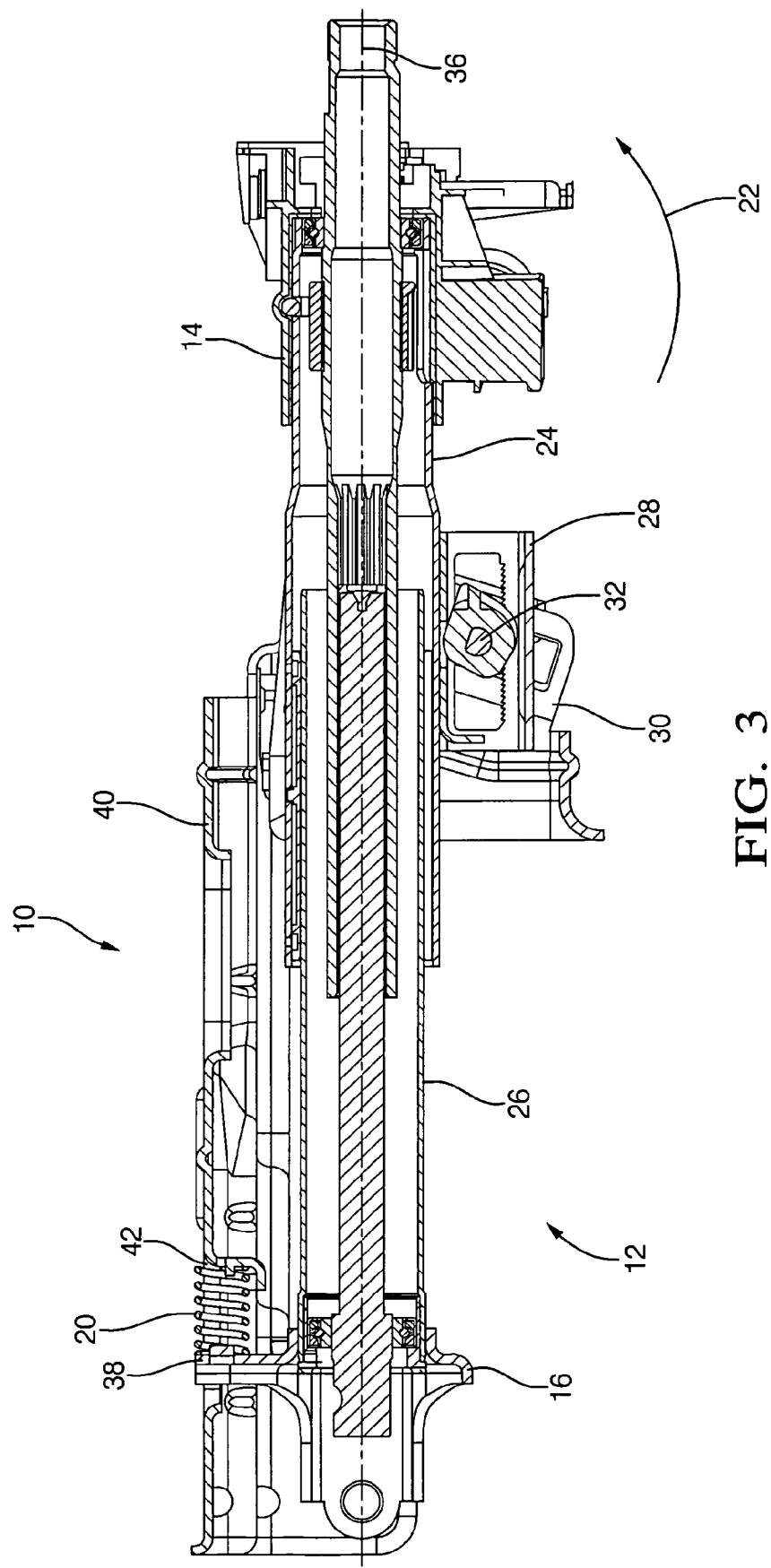
FIG. 3 is a cross-sectional view taken along lines 3-3 in FIG. 1.

Referring now to FIGS. 1-3, the exemplary apparatus 10 of the invention includes a steering column 12 extending axially between first and second ends 14, 16. A steering wheel can be mounted adjacent to the first end 14. The steering column 12 is pivotally mountable to a vehicle at the second end 16. The steering column 12 can be pivoted by a driver of the vehicle to a position of adjustment that is preferred so that the steering wheel is in a desired location.

The steering column 12 can also be telescopically adjusted by the driver so that the steering wheel is in a desired location. The steering column 12 includes upper and lower jackets 24, 26 telescopically disposed with respect to one another. The upper jacket 24 defines the first end 14 and the lower jacket 26 defines the second end 16.

The apparatus also includes a locking mechanism 18 spaced from the second end 16. The locking mechanism 18 is operative to releasibly secure the steering column 12 in the selected position of adjustment. The locking device 18 selectively prevents telescopic movement and tilting movement of the steering column 12. The locking mechanism 18 is operative to selectively lock the upper jacket 24 with respect to the vehicle.

The apparatus also includes a coil spring 20 in compression and urging the steering column 12 in a first pivoting direction 22. The first pivoting direction 22 is away from the lap of the driver. The spring 20 is disposed in axially spaced relation adjacent to the locking mechanism 18. The spring 20 extends parallel to said steering column 12 and is axially spaced from said upper jacket 24.

The steering column 12 includes a longitudinal axis 36 and a first surface 38. The first surface 38 extends substantially transverse to and is spaced from the longitudinal axis 36. The spring 20 engages the first surface 38 to urge the steering column 12 in the first pivoting direction 22.

The locking mechanism 18 of the exemplary embodiment of the invention includes a telescoping bracket 28 substantially surrounding the steering column 12. The telescoping bracket 28 is fixedly associated with the upper jacket 24. The locking mechanism 18 also includes a rake bracket 30 that substantially surrounds the telescoping bracket 28. The rake bracket 30 substantially surrounds the upper jacket 24 and is mountable to the vehicle. The locking mechanism 18 also includes a rake bolt 32 that extends through the telescoping and rake brackets 28, 30 and is moveable relative to the telescoping and rake brackets 28, 30 to selectively, fixedly associate the upper jacket 24 to the vehicle. The rake bolt 32 includes appropriate locking structure, such as teeth or compression-generating cams, such that the upper jacket 24 is fixedly associated with the vehicle when the rake bolt 32 is in a first position and is movably associated with the vehicle when the rake bolt 32 is in a second position.

The locking mechanism 18 also includes at least one capsule 34 releasibly engageable with the rake bracket 30. If the vehicle is involved in a crash and the driver generates a force against the steering wheel, the rake bracket 30 and the at least one capsule 34 can separate from one another. The coiled compression spring 20 urges the steering column 12 in the first pivoting direction 22 when the at least one capsule 34 is engaged with the rake bracket 30 and when the at least one capsule 34 and the rake bracket are separated from one another. As a result, if the at least one capsule 34 and the rake bracket separate from one another, the steering column will not drop into the lap of the driver.

The spring 20 and the rake bolt 32 are disposed on opposite sides of said steering column 12. For example, the spring 20 is disposed adjacent to a top of the steering column 12 and the rake bolt 32 is disposed adjacent to a top of the steering column 12. Also, in the exemplary embodiment of the invention, the spring 20 extends transverse to said rake bolt 32. For example, the spring 20 extends parallel to the axis 36 and the rake bolt 32 extends transverse to the axis 36. Also, the spring 20 and the rake bolt 32 are axially spaced from one another along the axis 36. As a result of the spacing between the spring 20 and the rake bolt 32, the spring 20 does not contribute frictional drag forces to the upper jacket 24 during telescopic adjustment of the steering column 12. In previous steering columns, a spring acts on a rake bolt and causes frictional drag forces.

The exemplary embodiment of the invention includes a mounting bracket 40 operative to be attached to a vehicle. The lower jacket 26 is pivotally engaged with the mounting bracket 40 and the locking mechanism 18 selectively locks the upper jacket 24 to the mounting bracket 40. The rake bracket 30 is releasably connected to the mounting bracket 40 with the at least one capsule 34. The spring 20 is disposed between the first surface 38 and the mounting bracket 40. The mounting bracket 40 defines an aperture 42 and the spring 20 is disposed at least partially in the aperture 42.

The exemplary method of the invention includes the step of pivotally mounting the steering column 12, which extends axially between the first and second ends 14, 16, to the vehicle. The method also includes the step of releasably securing the steering column 12 in the selected position of adjustment with the locking mechanism 18, which is spaced from the second end 16. The method also includes the step of urging the steering column 12 in the first pivoting direction 22 with the coiled compression spring 20, which is disposed in axially spaced relation adjacent to the locking mechanism 18. The method may also include the step of releasably connecting the locking mechanism 18 to the vehicle. The urging step can be further defined as urging the steering column 12 in the first pivoting direction 22 with the spring 20 when the locking mechanism 18 is connected to the vehicle and when the locking mechanism 18 is unconnected with respect to the vehicle.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus comprising:
a steering column extending along a longitudinal axis between first and second ends and pivotally mountable to a vehicle at said second end;
a locking mechanism spaced from said second end and operative to releasably secure said steering column in a selected position of adjustment;
a mounting bracket axially spaced from said locking mechanism;
a first surface extending from said steering column, wherein said first surface is substantially perpendicular to said longitudinal axis and is opposed to said mounting bracket; and
a coiled compression spring disposed between said first surface and said mounting bracket, said first surface being biased apart from said mounting bracket by said coiled compression spring, whereby said steering column is urged in a first pivoting direction.

2. The apparatus of claim 1 wherein said steering column includes upper and lower jackets telescopically disposed with respect to one another.

3. The apparatus of claim 2 wherein said upper jacket defines said first end and said lower jacket defines said second end.

4. The apparatus of claim 3 wherein said locking mechanism is operative to selectively lock said upper jacket with respect to the vehicle.

5. The apparatus of claim 4 wherein said coiled compression spring is axially spaced from said upper jacket.

6. The apparatus of claim 5 wherein said coiled compression spring extends parallel to said steering column.

7. The apparatus of claim 1 wherein said locking mechanism includes a telescoping bracket substantially surrounding said steering column, a rake bracket substantially surrounding said telescoping bracket, and a rake bolt extending through said telescoping and rake brackets, wherein said coiled compression spring extends transverse to said rake bolt.

8. The apparatus of claim 7 wherein said locking mechanism includes at least one capsule releasably engageable with said rake bracket.

9. The apparatus of claim 8 wherein said coiled compression spring urges said steering column in said first pivoting direction when said at least one capsule is engaged with said rake bracket and when said at least one capsule is disengaged with respect to said rake bracket.

10. The apparatus of claim 9 wherein said coiled compression spring and said rake bolt are disposed on opposite sides of said steering column.

11. The apparatus of claim 1 wherein said steering column includes a longitudinal axis and a first surface extending substantially transverse to and spaced from said longitudinal axis, wherein said coiled compression spring engages said first surface.

12. An apparatus comprising:
a mounting bracket operative to be attached to a vehicle;
a steering column extending along a longitudinal axis between first and second ends and pivotally mountable to a vehicle at said second end, wherein said steering column includes a lower jacket pivotally engaged with said mounting bracket and an upper jacket telescopically engaged with said lower jacket;
a first surface extending from said lower jacket, wherein said first surface is substantially perpendicular to said longitudinal axis and is opposed to said mounting bracket;
a locking mechanism spaced from said second end and operative to releasably secure said steering column in a selected position of adjustment, wherein said locking mechanism selectively locks said upper jacket of said steering column to said mounting bracket; and
a coiled compression spring disposed between said first surface and the mounting bracket axially spaced from the locking mechanism for urging said steering column in a first pivoting direction.

13. The apparatus of claim 12 wherein said steering column defines a longitudinal axis and said lower jacket defines a first surface extending substantially transverse to and spaced from said longitudinal axis, wherein said coiled compression spring is disposed between said first surface and said mounting bracket.

14. The apparatus of claim 13 wherein said locking mechanism includes a rake bracket substantially surrounding said upper jacket and releasibly connected to said mounting bracket.

15. The apparatus of claim 14 wherein said locking mechanism further comprises:

a telescoping bracket fixedly associated with said upper jacket and substantially surrounded by said rake bracket; and a rake bolt extending through said telescoping and rake bracket, wherein said coiled compression spring is disposed on an opposite side of said steering column with respect to said rake bolt.

16. The apparatus of claim 14, wherein said coiled compression spring extends transverse to said rake bolt.

17. The apparatus of claim 16 wherein said mounting bracket defines an aperture and said coiled compression spring is disposed at least partially in said aperture.

\* \* \* \* \*